US 6,736,961 B2

United States Patent
Plummer et al.

(10) Patent No.: US 6,736,961 B2
(45) Date of Patent: May 18, 2004

(54) REMOVAL OF SULFUR FROM A HYDROCARBON THROUGH A SELECTIVE MEMBRANE

(75) Inventors: Mark A. Plummer, Littleton, CO (US); Richard F. Bonelli, Jr., Robinson, IL (US)

(73) Assignee: Marathon Oil Company, Findlay, OH (US)

( * ) Notice: Subject to any disclaimer, the term of this patent is extended or adjusted under 35 U.S.C. 154(b) by 0 days.

(21) Appl. No.: 09/774,826

(22) Filed: Jan. 30, 2001

(65) Prior Publication Data

US 2002/0139713 A1 Oct. 3, 2002

(51) Int. Cl.⁷ .......................... C10G 31/00; C07C 7/144
(52) U.S. Cl. .................. 208/208 R; 208/211; 585/818; 210/649
(58) Field of Search ............................ 208/208 R, 211; 585/818; 210/649

(56) References Cited

U.S. PATENT DOCUMENTS

| | | | | |
|---|---|---|---|---|
| 2,960,462 A | * | 11/1960 | Lee et al. .................... 208/308 |
| 3,244,763 A | * | 4/1966 | Cahn ......................... 210/644 |
| 3,370,102 A | * | 2/1968 | Carpenter et al. ............. 203/88 |
| 3,485,746 A | | 12/1969 | Setzer et al. ................. 208/244 |
| 3,556,990 A | * | 1/1971 | Gulko ......................... 208/290 |
| 3,956,112 A | * | 5/1976 | Lee et al. ............... 210/500.23 |
| 4,417,986 A | * | 11/1983 | Connaught et al. .......... 208/226 |
| 4,783,202 A | | 11/1988 | Kraus et al. .................... 55/16 |
| 4,831,208 A | * | 5/1989 | Zarchy ..................... 208/120.3 |
| 4,865,826 A | * | 9/1989 | Carnell et al. ................ 423/230 |
| 4,978,439 A | | 12/1990 | Carnell et al. ................. 208/91 |
| 5,045,206 A | * | 9/1991 | Chen et al. ................... 210/640 |
| 5,082,472 A | | 1/1992 | Mallouk et al. ................. 55/16 |
| 5,114,689 A | | 5/1992 | Nagji et al. .................. 423/230 |
| 5,415,681 A | | 5/1995 | Baker ............................ 95/45 |
| 5,643,442 A | | 7/1997 | Sweet et al. ................. 208/302 |
| 5,849,980 A | * | 12/1998 | Lai .............................. 585/818 |
| 2002/0111524 A1 | * | 8/2002 | Minhas et al. ............... 585/818 |
| 2002/0153284 A1 | * | 10/2002 | White et al. ................. 208/209 |

FOREIGN PATENT DOCUMENTS

| | | | | |
|---|---|---|---|---|
| CA | 1263845 | | 12/1989 | |
| EP | 0329301 A2 | * | 8/1989 | |
| GB | 2268186 A | * | 1/1994 | ........... C10G/31/11 |
| WO | WO-95/07134 A1 | * | 3/1995 | |

OTHER PUBLICATIONS

Sirkar, K., "Membrane Separation Technologies: Current Developments", *Chem. Eng. Comm.*, v.157, pp. 145–184, 1997.
Sparks, B. D. et al., "Upgrading of Solvent Extracted Athabasca Bitumen by Membrane Ultrafiltration", *AIChE Journal*, v.36, n.8, pp. 1279–1282, Aug. 1990.
Sartori, G., "Poly (Fluoroolefin) Membranes for Aromatics / Saturates Separation", Abstract, AIChE Annual Meeting, Session 31, Nov. 1997.

* cited by examiner

*Primary Examiner*—Walter D. Griffin
(74) *Attorney, Agent, or Firm*—Jack E. Ebel; Rodney F. Brown

(57) ABSTRACT

A process for removing sulfur from a hydrocarbon employs a solid membrane. A feed stream is provided containing a feed liquid hydrocarbon and a feed sulfur species and a sweep stream is provided containing a sweep liquid hydrocarbon. A relatively large quantity of the feed stream is conveyed past one side of the solid membrane, while a relatively small quantity of the sweep stream is conveyed past the opposite side of the solid membrane. The feed sulfur species is transported in a permeate from the feed stream through the solid membrane to the sweep stream. As a result, the feed stream is converted to a relatively large quantity of a substantially sulfur-free reject stream containing a primary hydrocarbon product, while the sweep stream combines with the permeate to produce a relatively small quantity of a sulfur-enriched stream, which is amenable to further processing.

42 Claims, 1 Drawing Sheet

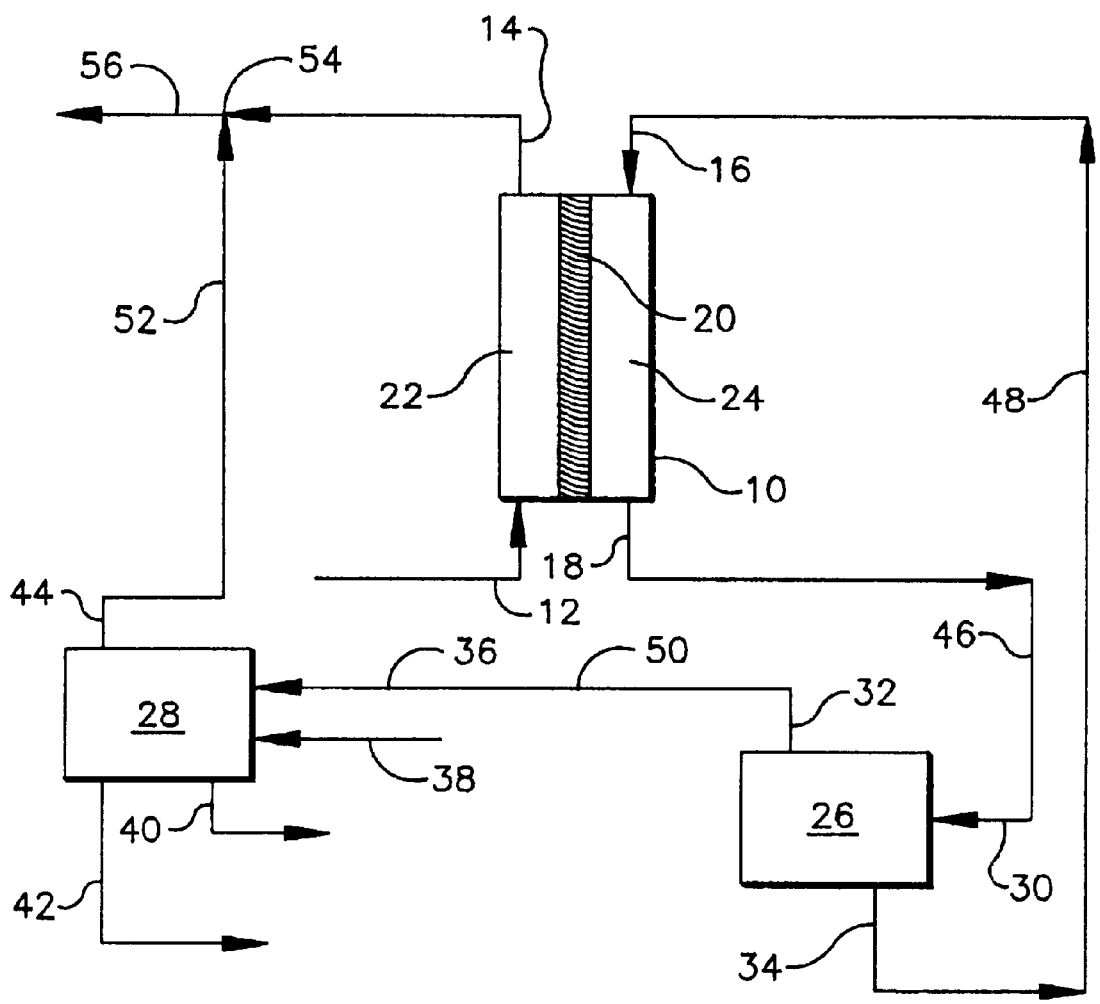

REMOVAL OF SULFUR FROM A HYDROCARBON THROUGH A SELECTIVE MEMBRANE

TECHNICAL FIELD

The present invention relates generally to a process for removing sulfur from a feed stream using a selective membrane and, more particularly, to a sulfur removal process, wherein sulfur species are withdrawn from a hydrocarbon feed stream by selective permeation through a solid membrane.

BACKGROUND OF THE INVENTION

Environmental regulations have become increasingly strict with respect to the level of sulfur permitted in hydrocarbon products from refineries, gas plants and other sources. As the maximum allowable amount of sulfur in hydrocarbon products shrinks due to tightening governmental constraints, conventional processes for removing sulfur from hydrocarbon streams, such as hydrotreating, become more difficult and costly to perform. Furthermore, many conventional sulfur removal processes are performed under relatively severe temperature, pressure or other process conditions, which can diminish the desirable properties of the treated hydrocarbon. For example, gasoline typically exhibits octane loss when subjected to hydrotreating. The present invention recognizes a need for a hydrocarbon desulfurization process, which is both operationally practical and cost effective, yet which does not substantially diminish the desirable properties of the resulting hydrocarbon product.

Accordingly, it is an object of the present invention to provide a process for effectively removing sulfur from a hydrocarbon. More particularly, it is an object of the present invention to provide a process for effectively removing sulfur from a liquid hydrocarbon stream in a refinery or other hydrocarbon processing facility. It is another object of the present invention to provide a desulfurization process, wherein the sulfur in the liquid hydrocarbon stream is concentrated during a preliminary stage into a smaller stream than the liquid hydrocarbon stream to reduce the throughput to the desulfurization process. It is a further object of the present invention to provide a desulfurization process, wherein the liquid hydrocarbon stream is not subjected to severe process conditions, which could diminish the desirable properties of the liquid hydrocarbon stream. These objects and others are achieved in accordance with the invention described hereafter.

SUMMARY OF THE INVENTION

The present invention is a process for removing sulfur from a hydrocarbon. A relatively larger quantity of a feed stream is conveyed past a first side of a solid membrane, while a relatively smaller quantity of a sweep stream is conveyed past a second side of the membrane. The weight ratio of the sweep stream to the feed stream is preferably below about 0.2. The feed stream comprises a feed liquid hydrocarbon and a feed sulfur species, which the practitioner desires to remove from the feed liquid hydrocarbon. The feed sulfur species is substantially more membrane permeable than said feed liquid hydrocarbon. The feed liquid hydrocarbon is preferably a conventional refinery hydrocarbon stream such as naphtha, diesel, or a mixture thereof. The feed sulfur species is preferably an organic sulfur compound, elemental sulfur, hydrogen sulfide, or a mixture thereof. Preferred organic sulfur compounds include thiols, alkylated thiols, thiophenes, alkylated thiophenes, benzothiophenes, alkylated benzothiophenes, dibenzothiophenes, alkylated dibenzothiophenes, and mixtures thereof. The sweep stream comprises a sweep fluid, which is preferably sweep liquid hydrocarbon selected from the group consisting of naphtha, diesel, cycle oil, and mixtures thereof.

The membrane is preferably formed from a solid material, which is relatively more selective for the feed sulfur species than the feed liquid hydrocarbon. Preferred sulfur-selective compounds include nitrogen compounds, nitrogen oxide compounds, oxygen compounds, sulfur compounds, and sulfur oxide compounds, and mixtures thereof. Alternatively, the solid membrane may contain a facilitated transport liquid, preferably an amine, hydroxyamine, alcohol, or mixture thereof. If the solid membrane contains a facilitated transport liquid, the sweep stream preferably includes a decoupling agent species. The decoupling agent species is selected from the group consisting of amines, hydroxyamines, alcohols, sulfur compounds, and mixtures thereof.

The feed sulfur species is transported in a permeate from the feed stream through the solid membrane to the sweep stream. As a result, the feed stream is converted to a relatively larger quantity of a substantially sulfur-free reject stream containing a primary hydrocarbon product, while the sweep stream combines with the permeate to produce a relatively smaller quantity of a sulfur-enriched stream, which is amenable to further processing.

Further processing may comprise distilling the sulfur-enriched stream to separate the feed sulfur species from the sweep liquid hydrocarbon. After separation, the feed sulfur species is dehydrogenated to produce a residual hydrocarbon product, which is combined with the primary hydrocarbon product to obtain a recovered hydrocarbon stream. The sweep liquid hydrocarbon is recycled to the second side of the solid membrane. Alternatively, the entire sulfur-enriched stream is dehydrogenated to produce the residual hydrocarbon product. The residual hydrocarbon product is then separated from the sweep liquid hydrocarbon and combined with the primary hydrocarbon product, while recycling the sweep liquid hydrocarbon.

In accordance with another embodiment of the present sulfur removal process, the sweep stream is omitted from the second side of the membrane. The feed stream is conveyed past the first side of the membrane as above, but when the permeate passes through the membrane to the second side, it is collected and hydrogenated by itself to produce the residual hydrocarbon product.

The invention will be further understood from the accompanying drawings and description.

BRIEF DESCRIPTION OF THE DRAWING

The FIGURE is a schematic flow chart of a preferred embodiment of the process of the present invention.

DESCRIPTION OF PREFERRED EMBODIMENT

Referring to the FIGURE, the flow chart comprises a membrane separation unit 10 having a feed inlet 12, a reject outlet 14, a sweep inlet 16, and a sulfur-enriched outlet 18. A selective membrane 20 is mounted in the membrane separation unit 10 and divides the membrane separation unit 10 into a feed chamber 22 and a sweep chamber 24, which are positioned on opposite sides of the selective membrane 20. The flow chart further includes a distillation unit 26 and a hydrogenation unit 28. The distillation unit 26 has a sulfur-enriched inlet 30, an overhead outlet 32 and a bottom outlet 34. The hydrogenation unit 28 has an overhead inlet 36, a hydrogen inlet 38, a hydrogen sulfide outlet 40, a water outlet 42 and a residual hydrocarbon outlet 44. A sulfur-enriched line 46 provides fluid communication between the sulfur-enriched outlet 18 of the membrane separation unit 10 and the sulfur-enriched inlet 30 of the distillation unit 26. A sweep recycle line 48 provides fluid communication between the bottom outlet 34 of the distillation unit 26 and the sweep inlet 16 of the membrane separation unit 10. An overhead line 50 provides fluid communication between the overhead outlet 32 of the distillation unit 26 and the overhead inlet 36 of the hydrogenation unit 28. A residual hydrocarbon line 52 provides fluid communication between the residual hydrocarbon outlet 44 of the hydrogenation unit 28 and the reject outlet 14 of the membrane separation unit 10.

The present process is initiated by a preliminary membrane separation stage, wherein a feed stream is fed from the feed inlet 12 through the feed chamber 22 in a first direction past the membrane 20 toward the reject outlet 14. The preferred temperature of the feed stream as it is fed into the feed chamber 22 is from about 10 to 93° C. The feed chamber 22 is preferably maintained at a pressure within a range of about 6.9 to 6900 kPa gauge. A sweep stream is simultaneously fed from the sweep inlet 16 through the sweep chamber 24 in a second direction past the membrane 20 toward the sulfur-enriched outlet 18. The second direction is shown in the FIGURE to be opposite the first direction, wherein the flow of the feed stream is countercurrent to the flow of the sweep stream. Although not shown, it is alternatively within the scope of the present invention to reconfigure the flow chart such that the second direction is the same as the first direction, wherein the flow of the feed stream is co-current to the flow of the sweep stream.

The preferred temperature of the sweep stream as it is fed into the sweep chamber 24 is within the same range as the feed stream. The sweep chamber 24 is preferably maintained at a pressure less than that of the feed chamber 22 and more preferably within a range of about 0 to 6890 kPa gauge. Thus, the sweep chamber 24 is on the low pressure side of the membrane 20 and the feed chamber 22 is on the high pressure side of the membrane 20. The weight ratio of the sweep stream entering the sweep chamber 24 to the feed stream entering the feed chamber 22 is less than 1, preferably less than about 0.2, and more preferably from about 0.01 to 0.05. Thus, the sweep stream is substantially smaller than the feed stream.

The feed stream entering the feed inlet 12 comprises a less membrane permeable liquid hydrocarbon and a more membrane permeable sulfur species. The term "more membrane permeable" is used herein to denote materials, for which the membrane 20 has a substantially higher permeation selectivity relative to "less membrane permeable" materials, for which the membrane 20 has a substantially lower permeation selectivity. Thus, more membrane permeable materials are more able to pass through the selective membrane 20 than the less membrane permeable materials.

The more membrane permeable sulfur species, termed hereafter the feed sulfur species, is preferably selected from an organic sulfur compound, elemental sulfur, hydrogen sulfide, and combinations thereof. Exemplary organic sulfur compounds include the following: thiols, alkylated thiols, thiophenes, alkylated thiophenes, benzothiophene, alkylated benzothiophenes, dibenzothiophenes, alkylated dibenzothiophenes and mixtures thereof. The feed sulfur species is preferably soluble in the less membrane permeable liquid hydrocarbon. The concentration of sulfur as sulfur atoms in the feed stream, which are attributable to the feed sulfur species, is preferably between about 50 and 10,000 ppm, and more preferably between about 100 and 5,000 ppm.

The less membrane permeable liquid hydrocarbon, termed hereafter the feed liquid hydrocarbon, is preferably a conventional refinery stream such as naphtha, diesel, or a mixture thereof. The feed liquid hydrocarbon may be susceptible to diminished utility when subjected to the severe temperature or pressure conditions of conventional desulfurization techniques such as direct hydrogenation or the like. For example, the feed liquid hydrocarbon may exhibit undesirable octane loss when subjected to hydrogenation. The feed stream may further comprise ancillary non-sulfur species in addition to the feed liquid hydrocarbon. The ancillary non-sulfur species may have the same membrane permeability as the feed liquid hydrocarbon or may be more or less membrane permeable.

As the feed and sweep streams flow through the membrane separation unit 10, a permeate comprising the feed sulfur species is separated from the feed stream in the feed chamber 22 by transport through the membrane 20 to the sweep chamber 24 where the permeate combines with the sweep stream. The sweep stream entering the sweep inlet 16 comprises a liquid which is capable of entraining the permeate transported through the selective membrane 20 into the sweep chamber 24. The sweep stream preferably comprises a liquid hydrocarbon and more preferably a liquid hydrocarbon, in which the permeate is soluble, which is less membrane permeable than the permeate, and which has a different boiling point, either higher or lower, than the permeate. A preferred liquid hydrocarbon having utility as the sweep stream is diesel, cycle oil, naphtha, or mixtures thereof. Thus, it is apparent that the liquid hydrocarbon of the sweep stream, termed hereafter the sweep liquid hydrocarbon, may or may not have the same composition as the feed liquid hydrocarbon. The sweep stream may also include other species as well as the sweep liquid hydrocarbon. For example, the sweep stream may include a decoupling agent species, which is added to the sweep stream for purposes described below with reference to the selective membrane 20. Exemplary decoupling agent species include amines, hydroxyamines, alcohols, certain sulfur compounds and mixtures thereof. The sweep stream may also include sweep sulfur species, which are preferably, but not necessarily, different from the feed sulfur species of the permeate. In general, it is preferred, but not required, that the other species of the sweep stream are less membrane permeable than the permeate.

The selective membrane 20 is a solid membrane, which may be physically configured in substantially any manner known to the skilled artisan such as in the configuration of a flat plate, a spiral, or hollow fiber. A solid membrane having utility in the present process is one which exhibits a relatively higher permeation selectivity to the feed sulfur species, but which exhibits a relatively lower permeation selectivity to the feed liquid hydrocarbon. In general, nitrogen compounds, nitrogen oxide compounds, oxygen compounds, sulfur compounds, and sulfur oxide compounds have been found to exhibit a relatively high degree of sulfur permeation selectivity. Thus, a preferred selective solid membrane is one which integrates one or more of these compounds into the structure of the membrane. For example, a preferred solid membrane is formed from an organic polymer such as polyacrylonitrile, polyamide, polysulfone, or a combination thereof.

It is further within the scope of the present invention to form the solid membrane from alternate compounds than those recited above. In such cases it may be desirable to add a facilitated transport liquid to the solid membrane by adsorption or absorption. The facilitated transport liquid facilitates transport of the permeate through the solid membrane by complexing with the sulfur species of the permeate upon contact. A decoupling agent species provided in the sweep stream as described above breaks the complexes upon entering the sweep chamber 24. Examples of preferred facilitated transport liquids include amines, hydroxyamines, such as ethanolamine and diethanolamine, or alcohols, such as glycerol The selectivity of a solid membrane is known to be primarily a function of the process conditions and the specific composition of the membrane and feed stream. When provided with the teaching herein, it is within the purview of the skilled artisan to choose a specific solid membrane, and optionally a facilitated transport liquid, which will provide optimum selectivity for a given feed stream in the practice of the present process. Accordingly, the present process is not limited to a specific solid membrane or facilitated transport liquid. Nevertheless, the selective solid membrane employed in the present process exhibits a permeation selectivity for the feed sulfur species greater than 1, preferably from about 5 to 200, and more preferably from about 15 to 100, wherein permeation selectivity is defined as the sulfur concentration of the permeate divided by the sulfur concentration of the feed stream. In contrast, the selective solid membrane exhibits a permeation selectivity for the feed liquid hydrocarbon less than 1. If a decoupling agent species is employed in the present process, it preferably exhibits a decoupling selectivity from about 1 to 100, and more preferably from about 2 to 50, wherein decoupling selectivity is defined as the sulfur concentration of the combined permeate and sweep stream in the sulfur-enriched outlet 18 divided by the sulfur concentration of the feed stream in the feed inlet 12.

The feed stream is termed a reject stream after the permeate is separated from the feed stream, while the sweep stream is termed a sulfur-enriched stream after the permeate is combined with the sweep stream. At the conclusion of the membrane separation stage, the reject stream exits the feed chamber 22 of the membrane separation unit 10 via the reject outlet 14, while the sulfur-enriched stream exits the sweep chamber 24 of the membrane separation unit 10 via the sulfur-enriched outlet 18. The reject stream exiting the feed chamber 22 is a primary hydrocarbon product of the present process and is characterized as substantially sulfur free, having a sulfur concentration from about 1 to 100 ppm. The sulfur-enriched stream exiting the sweep chamber 24 is characterized as sulfur rich. It is noted that the membrane separation stage removes the sulfur from the feed stream, but ultimately does not substantially chemically alter the form of the sulfur transported to the sweep stream.

The sulfur-enriched stream is conveyed from the sulfur-enriched outlet 18 via the sulfur-enriched line 46 to the distillation unit 26, wherein a distillation stage is performed. The sulfur-enriched stream enters the distillation unit 26 via the sulfur-enriched inlet 30 and is distilled in the distillation unit 26. The distillation unit 26 separates the sulfur-enriched stream into a lower boiling overhead stream and a higher boiling bottom stream. The overhead stream is a reversion of the permeate and the bottom stream is a reversion of the sweep stream or vice versa depending on the respective relative boiling points of the sweep stream and permeate. In either case the bottom stream is withdrawn from the bottom outlet 34 of the distillation unit 26 and the overhead stream is withdrawn from the overhead outlet 32 of the distillation unit 26.

If the higher boiling bottom stream is the sweep stream, it is returned as shown in the FIGURE via the sweep recycle line 48 to the sweep inlet 16 for recycling into the membrane separation unit 10. Should any losses of sweep stream occur in the membrane separation stage or distillation stage, a make up quantity of fresh sweep stream can be added to the recycled sweep stream. If the lower boiling overhead stream is the permeate, it is withdrawn from the overhead outlet 32 of the distillation unit 26 and conveyed via the overhead line 50 to the hydrogenation unit 28, wherein a hydrogenation stage is performed. The overhead stream is injected into the hydrogenation unit 28 via the overhead inlet 36 and hydrogen is injected into the hydrogenation unit 28 via the hydrogen inlet 38.

The overhead stream, i.e., permeate, is conventionally hydrogenated with hydrogen within the hydrogenation unit 28. Hydrogenation chemically converts the permeate into three distinct components: hydrogen sulfide, water and a residual hydrocarbon product, which has a significantly lower sulfur concentration relative to the feed stream in the feed inlet 12. The hydrogen sulfide and water are discharged from the hydrogenation unit 28 via the hydrogen sulfide outlet 40 and water outlet 42 as by-products. The residual hydrocarbon product is withdrawn from the hydrogenation unit 28 via the residual hydrocarbon outlet 44 and conveyed to the reject outlet 14 via the residual hydrocarbon line 52. The residual hydrocarbon line 52 intersects the reject outlet 14 at an intersection point 54 to form a hydrocarbon product line 56 downstream of the intersection point 54. The residual hydrocarbon product combines with the reject stream, i.e., the primary hydrocarbon product, at the intersection point 54 to form a recovered hydrocarbon product stream, which is conveyed through the hydrocarbon product line 56 to a desired locale for end use or further processing. The weight fraction of residual hydrocarbon product in the recovered hydrocarbon product stream is typically from about 0.1 to 20 and preferably about 1 to 5.

If the higher boiling bottom stream is the permeate and the lower boiling top stream the sweep stream, the flow chart is simply reversed in a manner readily apparent to the skilled artisan so that the higher boiling bottom stream is conveyed to the hydrogenation unit 28 and the lower boiling top stream is recycled to the membrane separation unit 10. In accordance with an alternate embodiment of the present invention not shown, the sulfur-enriched stream can be fed in its entirety directly from the sulfur-enriched outlet 18 to the hydrogenation unit 28. The entire sulfur-enriched stream is hydrogenated in the hydrogenation unit 28, conveyed to the distillation unit 26, and finally distilled therein to separate the sweep stream from the residual hydrocarbon product. In accordance with another alternate embodiment of the present invention not shown, the process can be practiced in the absence of a sweep stream. The permeate is transported from the feed chamber 22 through the selective membrane 20 in substantially the same manner as described above. However, the permeate is collected by itself on the opposite side of the membrane 20 from the feed chamber 22 and fed directly to the hydrogenation unit 28. The permeate is hydrogenated in the hydrogenation unit 28 to remove the sulfur species therefrom in substantially the same manner as described above.

The following examples demonstrate the scope and utility of the present invention, but are not to be construed as limiting the scope thereof. Each example is one in a series of experiments, wherein a feed stream is conveyed past a selective solid membrane for the purpose of transporting a permeate from the feed stream through the membrane in accordance with the teaching above. Selected experimental conditions are varied between each example to observe their effect on permeation performance. For all of the examples, however, the composition of the feed stream is maintained constant.

The feed stream for all of the examples is naphtha having a boiling range of 10 to 260° C., a density of 0.74 g/cc, and a total sulfur content as sulfur atoms of 1750 ppm. The sulfur is distributed among a plurality of organic compounds as follows (expressed as weight % of total sulfur):

4.0 thiols
22.9 thiophenes
9.9 benzothiophene
28.0 methylbenzothiophenes
18.5 dimethylbenzothiophenes
7.4 trimethylbenzothiophenes
9.3 compounds boiling higher than trimethylbenzothiophenes It is further noted that nitrogen is unable to permeate any of the membranes of the examples under applied pressure. This indicates that the major permeating mechanism is via relative solubility of the permeate and not relative diffusion through membrane pores of specified size.

EXAMPLE 1

Membrane
  Type: Nanofiltration SR-90 (available from FilmTec Corporation, 7200 Ohms Lane, Edina, Minn. 55439 USA)
  Configuration: flat plate
Operating Conditions
  Temperature: 21° C.
  Pressure: high side (naphtha), 1380–2760 kPa gauge; low side (permeate), 0 kPa gauge
  Naphtha feed flux: 1.5–5.5 g/min-cm$^2$ of membrane surface
Sweep Stream
  none
Permeation Selectivity
  1.0 across entire range of naphtha feed flux and naphtha pressure
Conclusion
  No naphtha species selectively permeate through the membrane.

EXAMPLE 2

Membrane
  Type: Nanofiltration SR-90 of Example 1, but containing solubilized liquid glycerol
  Configuration: flat plate
Operating Conditions
  Temperature: 21–22° C.
  Pressure: high side (naphtha), 1850–2190 kPa gauge; low side (permeate), 0 kPa gauge
  Naphtha feed flux: 2.6–7.7 g/min-cm$^2$ of membrane surface
Sweep Stream
  none
Permeation Selectivity
  1.1 to 4.4 depending on naphtha feed flux (see Table 1)

TABLE 1

| Naphtha Feed Flux | Permeation Selectivity |
|---|---|
| 2.6 | 1.1 |
| 3.2 | 1.7 |
| 5.9 | 4.4 |
| 7.7 | 4.2 |

Conclusion
  Examples 1 and 2 show that the presence of solubilized glycerol in the membrane facilitates selective sulfur permeation through the membrane.

EXAMPLE 3

Membrane
  Type: ultrafiltration G-10 (available from Osmonics Corporation, 5951 Clearwater Drive, Minnetonka, Minn. 55343 USA)
  Configuration: flat plate
Operating Conditions
  Temperature: 20–24° C.
  Pressure: high side (naphtha), 1650–2070 kPa gauge; low side (permeate), 0 kPa gauge
  Naphtha feed flux: 1.3–5.6 g/min-cm$^2$ of membrane surface
Sweep Stream
  none
Permeation Selectivity
  1.1 to 8.2 depending on naphtha feed flux (see Table 2)

TABLE 2

| Naphtha Feed Flux | Permeation Selectivity |
|---|---|
| 1.1 | 1.1 |
| 2.2 | 2.6 |
| 5.6 | 8.2 |

EXAMPLE 4

Membrane
  Type: Polysulfone SEP-0013 (available from Pall Corporation, 2200 Northern Blvd., East Hills, N.Y. 11548 USA) containing solubilized liquid glycerol
  Configuration: hollow fiber
Operating Conditions
  Temperature: 21–25° C.
  Pressure: high side (naphtha), 103 kPa gauge; low side (sweep and permeate), 0 kPa gauge
  Naphtha feed flux: 2.2–2.8 g/min-cm$^2$ of membrane surface
Sweep Stream
  Decane (zero sulfur content) at 1.1–2.2 wt % of naphtha feed
Permeation Selectivity
  5.8 to 16.8 depending on naphtha feed flux (see Table 3)

TABLE 3

| Naphtha Feed Flux | Permeation Selectivity |
|---|---|
| 2.2 | 5.8 |
| 2.6 | 13.1 |
| 2.7 | 16.8 |

Conclusion
  Comparison of examples 2 and 4 shows that improved sulfur permeation selectivities are obtained using a sweep stream.

EXAMPLE 5

Membrane
  same as Example 4
Operating Conditions
  Temperature: 21–25° C.

Pressure: high side (naphtha), 21–90 kPa gauge; low side (sweep and permeate), 0 kPa gauge Naphtha feed flux: 2.1–2.6 g/min-cm$^2$ of membrane surface Sweep Stream same as Example 4

Permeation Selectivity 1.6 to 13.1 depending on average naphtha pressure in feed chamber (see Table 4)

TABLE 4

| Naphtha Pressure | Permeation Selectivity |
|---|---|
| 13.1 | 1.6 |
| 11.2 | 6.8 |
| 3.1 | 13.1 |

Conclusion

Decreasing naphtha pressure increases sulfur permeation selectivity.

EXAMPLE 6

Membrane same as Example 4

Operating Conditions

Temperature: 21–25° C.

Pressure: high side (naphtha), 21–79.3 kPa gauge; low side (permeate and sweep), 0 kPa gauge Naphtha feed flux: 2.2–3.0 g/min-cm$^2$ of membrane surface Sweep Stream Decane (zero sulfur content) at 1.0–2.2 wt % of naphtha feed Diesel at 1.0–2.2 wt % of naphtha feed boiling range: 121–371° C.

density: 0.83 g/cc total sulfur content as sulfur atoms: 3330 ppm sulfur distribution in various organic compounds all boiling above trimethylbenzothiophenes Decoupling Selectivity See Table 5

TABLE 5

| Sweep Type | Naphtha Feed Flux | Decoupling Selectivity |
|---|---|---|
| decane | 3.1 | 1.2 |
| decane | 13.1 | 0.8 |
| diesel | 3.1 | 3.5 |
| diesel | 3.3 | 3.0 |
| diesel | 11.5 | 1.9 |

Conclusion

Diesel is a more effective sweep stream compared to decane. The diesel sulfur compounds act as decoupling agents to break the facilitated transfer complexes formed between the permeating naphtha sulfur species and the glycerol facilitated transfer liquid. No diesel sulfur species on the low pressure side of the membrane permeated through the membrane into the naphtha stream on the high pressure side of the membrane.

While the foregoing preferred embodiments of the invention have been described and shown, it is understood that alternatives and modifications, such as those suggested and others, may be made thereto and fall within the scope of the present invention.

We claim:

1. A process for removing sulfur from a hydrocarbon comprising:

conveying a feed stream past a first side of a selective solid membrane, wherein said feed stream comprises a feed liquid hydrocarbon and a feed sulfur species, and selective solid membrane is constructed from one or more compounds providing greater permeation selectivity for said feed sulfur species than said feed liquid hydrocarbon, and said selective solid membrane contains a facilitated transport liquid selected from the group consisting of amines, hydroxyamines, alcohols, and mixtures thereof;

conveying a sweep stream past a second side of said selective solid membrane; and transporting said feed sulfur species from said feed stream through said selective solid membrane in a permeate into said sweep stream, thereby converting said sweep stream to a sulfur-enriched stream and said feed stream to a substantially sulfur-free reject stream containing a primary hydrocarbon product.

2. The process of claim 1 wherein said sweep stream comprises a sweep liquid hydrocarbon.

3. The process of claim 2 wherein said sweep liquid hydrocarbon is selected from the group consisting of naphtha, diesel, cycle oil, and mixtures thereof.

4. The process of claim 1 wherein said feed sulfur species is more membrane permeable than said feed liquid hydrocarbon.

5. The process of claim 1 wherein said sweep stream is smaller than said feed stream on a weight basis.

6. The process of claim 1 wherein the weight ratio of said sweep stream to said feed stream is below about 0.2.

7. The process of claim 1 wherein said feed liquid hydrocarbon is a refinery hydrocarbon stream.

8. The process of claim 1 wherein said feed liquid hydrocarbon is selected from the group consisting of naphtha, diesel, and mixtures thereof.

9. The process of claim 1 wherein said feed sulfur species is selected from the group consisting of an organic sulfur compound, elemental sulfur, hydrogen sulfide and combinations thereof.

10. The process of claim 9 wherein said organic sulfur compound is selected from the group consisting of thiols, alkylated thiols, thiophenes, alkylated thiophenes, benzothiophene, alkylated benzothiophenes, dibenzothiophenes, alkylated dibenzothiophenes and mixtures thereof.

11. The process of claim 1 wherein said one or more compounds from which said selective solid membrane is constructed is selected from the group consisting of nitrogen compounds, nitrogen oxide compounds, oxygen compounds, sulfur compounds, sulfur oxide compounds, and mixtures thereof.

12. The process of claim 1 wherein said selective solid membrane is more selective for said feed sulfur species than said feed liquid hydrocarbon.

13. The process of claim 1 further comprising distilling said sulfur-enriched stream to separate said feed sulfur species from said sweep stream.

14. The process of claim 13 further comprising recycling said sweep stream separated from said feed sulfur species to said second side of said selective solid membrane.

15. The process of claim 1 wherein said one or more compounds from which said selective solid membrane is constructed is an organic polymer.

16. The process of claim 1 wherein said sweep stream is diesel.

17. The process of claim 1 wherein said sweep stream is naphtha.

18. A process for removing sulfur from a hydrocarbon comprising:
   conveying a feed stream past a first side of a selective solid membrane, wherein said feed stream comprises a feed liquid hydrocarbon and a feed sulfur species, and further wherein said selective solid membrane is constructed from one or more compounds providing greater permeation selectivity for said feed sulfur species than said feed liquid hydrocarbon;
   conveying a sweep stream past a second side of said selective solid membrane, wherein said sweep stream comprises a decoupling agent species; and
   transporting said feed sulfur species from said feed stream through said selective solid membrane in a permeate into said sweep stream, thereby converting said sweep stream to a sulfur-enriched stream and said feed stream to a substantially sulfur-free reject stream containing a primary hydrocarbon product.

19. The process of claim 18 wherein said decoupling agent species is selected from the group consisting of amines, hydroxyamines, alcohols, sulfur compounds, and mixtures thereof.

20. The process of claim 18 wherein said sweep stream is diesel.

21. The process of claim 18 wherein said sweep stream is naphtha.

22. A process for removing sulfur from a hydrocarbon comprising:
   conveying a feed stream past a first side of a selective solid membrane, wherein said feed stream comprises a feed liquid hydrocarbon and a feed sulfur species, said selective solid membrane is constructed from one or more compounds providing greater permeation selectivity for said feed sulfur species than said feed liquid hydrcarbon, and said selective solid membrane contains a facilitated transport liquid;
   transporting said feed sulfur species from said first side into said selective solid membrane in a permeate;
   complexing said feed sulfur species with said facilitated transport liquid to form a facilitated transport complex; and
   transporting said facilitated transport complex through said selective solid membrane to a second side of said selective solid membrane, thereby converting said feed stream to a substantially sulfur-free reject stream.

23. The process of claim 22 wherein said facilitated transport liquid is selected from the group consisting of amines, hydroxyamines, alcohols, and mixtures thereof.

24. The process of claim 22 further comprising decoupling said at least one sulfur species and said facilitated transport liquid by contacting said facilitated transport complex with a decoupling agent species on said second side.

25. The process of claim 24 wherein said decoupling agent species is selected from the group consisting of amines, hydroxyamines, alcohols, sulfur compounds, and mixtures thereof.

26. A process for removing sulfur from a hydrocarbon comprising:
   conveying a feed stream past a first side of a solid membrane, wherein said feed stream comprises a feed liquid hydrocarbon and a feed sulfur species;
   conveying a sweep stream past a second side of said solid membrane, wherein said sweep stream comprises a decoupling agent species;
   transporting said feed sulfur species from said feed stream through said solid membrane in a permeate into said sweep stream, thereby converting said sweep stream to a sulfur-enriched stream and said feed stream to a substantially sulfur-free reject stream containing a primary hydrocarbon product.

27. The process of claim 26 wherein said membrane contains a facilitated transport liquid.

28. The process of claim 27 wherein said facilitated transport liquid is selected from the group consisting of amines, hydroxyamines, alcohols, and mixtures thereof.

29. The process of claim 26 wherein said decoupling agent species is selected from the group consisting of amines, hydroxyamines, alcohols, sulfur compounds, and mixtures thereof.

30. The process of claim 27 wherein said decoupling agent species is selected from the group consisting of amines, hydroxyamines, alcohols, sulfur compounds, and mixtures thereof.

31. The process of claim 26 wherein said sweep stream is diesel.

32. The process of claim 26 wherein said sweep stream is naphtha.

33. A process for removing sulfur from a hydrocarbon comprising:
   conveying a feed stream past a first side of a solid membrane, wherein said feed stream comprises a feed liquid hydrocarbon and a feed sulfur species and wherein said solid membrane contains a facilitated transport liquid;
   transporting said feed sulfur species from said first side into said solid membrane in a permeate;
   complexing said feed sulfur species with said facilitated transport liquid to form a facilitated transport complex;
   transporting said facilitated transport complex through said solid membrane to a second side of said membrane, thereby converting said feed stream to a substantially sulfur-free reject stream; and
   decoupling said at least one sulfur species and said facilitated transport liquid by contacting said facilitated transport complex with a decoupling agent species on said second side.

34. The process of claim 33 wherein said decoupling agent species is selected from the group consisting of amines, hydroxyamines, alcohols, sulfur compounds, and mixtures thereof.

35. The process of claim 33 wherein said facilitated transport liquid is selected from the group consisting of amines, hydroxyamines, alcohols, and mixtures thereof.

36. A process for removing sulfur from a hydrocarbon comprising:
   conveying a feed stream past a first side of a selective solid membrane, wherein said feed stream comprises a feed liquid hydrocarbon and a feed sulfur species, said selective solid membrane is constructed from one or more compounds providing greater permeation selectivity for said feed sulfur species than said feed liquid hydrocarbon, and said one or more compounds is selected from the group consisting of polyacrylonitrile, polyamide, polysulfone, and combinations thereof;
   conveying a sweep stream past a second side of said selective solid membrane; and
   transporting said feed sulfur species from said feed stream through said selective solid membrane in a permeate into said sweep stream, thereby converting said sweep stream to a sulfur-enriched stream and said feed stream to a substantially sulfur-free reject stream containing a primary hydrocarbon product.

37. The process of claim 36 wherein said sweep stream is diesel.

38. The process of claim 36 wherein said sweep stream is naphtha.

39. A process for removing sulfur from a hydrocarbon comprising:

conveying a feed stream past a first side of a selective solid membrane, wherein said feed stream comprises a feed liquid hydrocarbon and a feed sulfur species, and further wherein said selective solid membrane is constructed from one or more compounds selected from the group consisting of polyacrylonitrile, polyamide, polysulfone, and combinations thereof providing greater permeation selectivity for said feed sulfur species than said feed liquid hydrocarbon; and transporting said feed sulfur species from said feed stream through said selective solid membrane to a second side of said selective solid membrane, thereby converting said feed stream to a substantially sulfur-free reject stream containing a primary hydrocarbon product.

40. The process of claim 39 wherein said feed liquid hydrocarbon is selected from the group consisting of naphtha, diesel, and mixtures thereof.

41. The process of claim 39 wherein said feed sulfur species is selected from the group consisting of an organic sulfur compound, elemental sulfur, hydrogen sulfide and combinations thereof.

42. The process of claim 41 wherein said organic sulfur compound is selected from the group consisting of thiols, alkylated thiols, thiophenes, alkylated thiophenes, benzothiophene, alkylated benzothiophenes, dibenzothiophenes, alkylated dibenzothiophenes and mixtures thereof.

* * * * *